March 5, 1957 L. M. REED 2,783,476
DRAIN RECEPTACLE
Filed Dec. 2, 1953 2 Sheets-Sheet 1

INVENTOR.
Leslie M. Reed.
BY
Fishburn & Mullendore
ATTORNEYS.

March 5, 1957  L. M. REED  2,783,476
DRAIN RECEPTACLE
Filed Dec. 2, 1953  2 Sheets-Sheet 2

INVENTOR.
Leslie M. Reed.
BY
Fishburn + Mullendore
ATTORNEYS.

United States Patent Office 2,783,476
Patented Mar. 5, 1957

2,783,476

DRAIN RECEPTACLE

Leslie M. Reed, Kansas City, Mo.

Application December 2, 1953, Serial No. 395,786

6 Claims. (Cl. 4—290)

This invention relates to drain receptacles, and more particularly to receptacles for use in kitchen sinks and the like for receiving vegetable peelings, garbage and like refuse and draining of water or other liquid therefrom.

Drain receptacles commonly called sink strainers that have been used for drainage of garbage and the like usually consist of a bottom and side walls with a plurality of small holes in the bottom wall for passage of water while the garbage is retained in the receptacle. Small particles of garbage often adhere or lodge in the holes, making the receptacle difficult to clean. Also in such receptacles the drainage cannot be stopped, resulting in the necessity of holding some other device under the receptacle during transportation from the sink to a place for disposal of the contents to prevent drips on the floor or persons' clothes. Previous attempts to provide a means of stopping the drainage have been complicated and expensive devices and also have presented cleaning problems.

The objects of the present invention are to provide a drain receptacle that has relatively movable members that are positioned for forming an opening for drainage of the receptacle when the receptacle is resting on a supporting surface and which members automatically move to a position stopping the drainage when the receptacle is lifted from the supporting surface; to provide a novel drain receptacle of two separable members characterized by the absence of small holes whereby the parts can be readily separated and easily cleaned; to provide a drain receptacle having a removable, imperforate bottom with at least one of the parts of the receptacle formed of material having some flexibility for facilitating disassembly; and to provide a drain receptacle that is economical to manufacture and easy to maintain in a sanitary condition.

In accomplishing these and other objects of the present invention, I have provided improved details of structure, the preferred forms of which are illustrated in the accompanying drawings, wherein:

Fig. 3 is a similar sectional view through the drain receptacle with the bottom positioned relative to the shell for drainage of the receptacle as when the receptacle is supported in a kitchen sink or the like.

Figure 1:
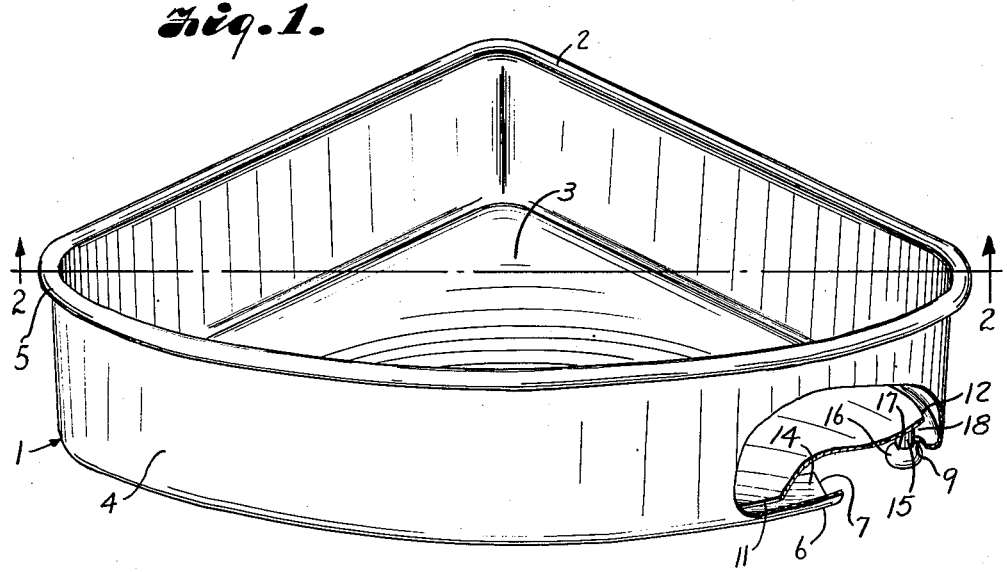
Fig. 1 is a perspective view of the drain receptacle with portions broken away to illustrate the arrangement of the bottom member in the outer shell.
Figure 2:
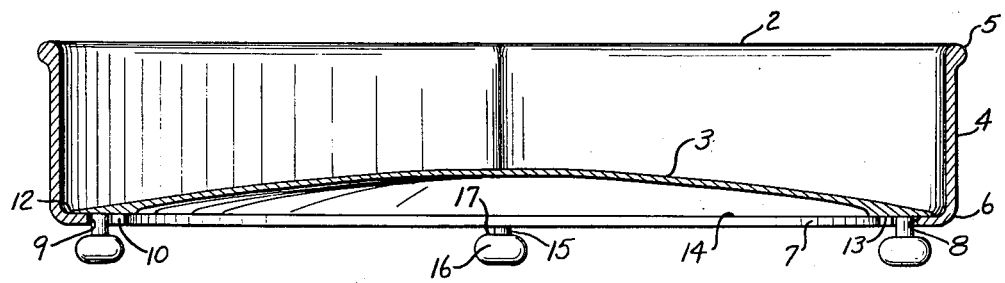
Fig. 2 is a transverse sectional view through the drain receptacle on the line 2—2, Fig. 1, with the bottom member in drainage stopping engagement with the shell.

Referring more in detail to the drawings:

1 designates a drain receptacle consisting of a shell member 2 and a bottom member 3, each of which is preferably formed of noncorrosive material with at least one member being of a material having some flexibility, such as rubber, polyethylene plastics and the like. The shell 2 has substantially vertical side walls 4 provided with an outwardly projecting bead 5 at the upper edges thereof. The lower edges of the walls 4 are curved inwardly as at 6 and terminate in inwardly projecting flanges 7. While the receptacle may be of any desired shape, it is desirable that for use in kitchen sinks the shape be substantially triangular with two of the sides arranged at approximately 90° to each other and the other side arcuate, whereby the receptacle can be placed in a corner of the sink. It is also preferably that the corners be arcuate to eliminate sharp angles from which it might be difficult to remove particles.

The inwardly turned flange 7 of the shell is preferably provided with keyhole slots 8 adjacent each corner of the shell. The keyhole slots have circular openings 9, the outermost portion of which is spaced from the curved portion 6 of the side walls, and an elongated opening 10 narrower than the diameter of the hole 9 extending from the hole to the inner edge of the flange 7.

The bottom member 3 consists of an imperforate wall having a crowned or convex upper surface and a peripheral edge 11 which conforms substantially to the shape of the inner surface of the walls 4 and is spaced therefrom as at 12. The lower surface 13 of the bottom member 3 and particularly the marginal portion thereof as from the peripheral edge 12 inwardly a distance substantially corresponding to the width of the flange 7 corresponds in slope to the upper surface 14 of said flange whereby when the surface 13 is seated on or engaged with the surface 14, drainage from the receptacle is stopped. In the structure illustrated, the central underneath portion of the bottom member is recessed or concaved upwardly for reduction in weight and increased flexibility.

Figure 3:
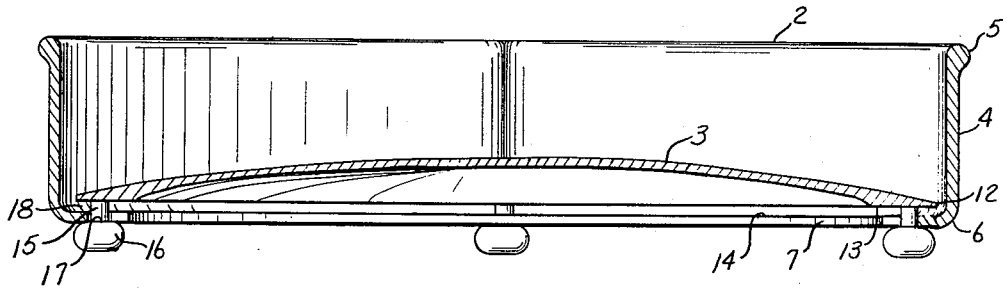
Figure 4:
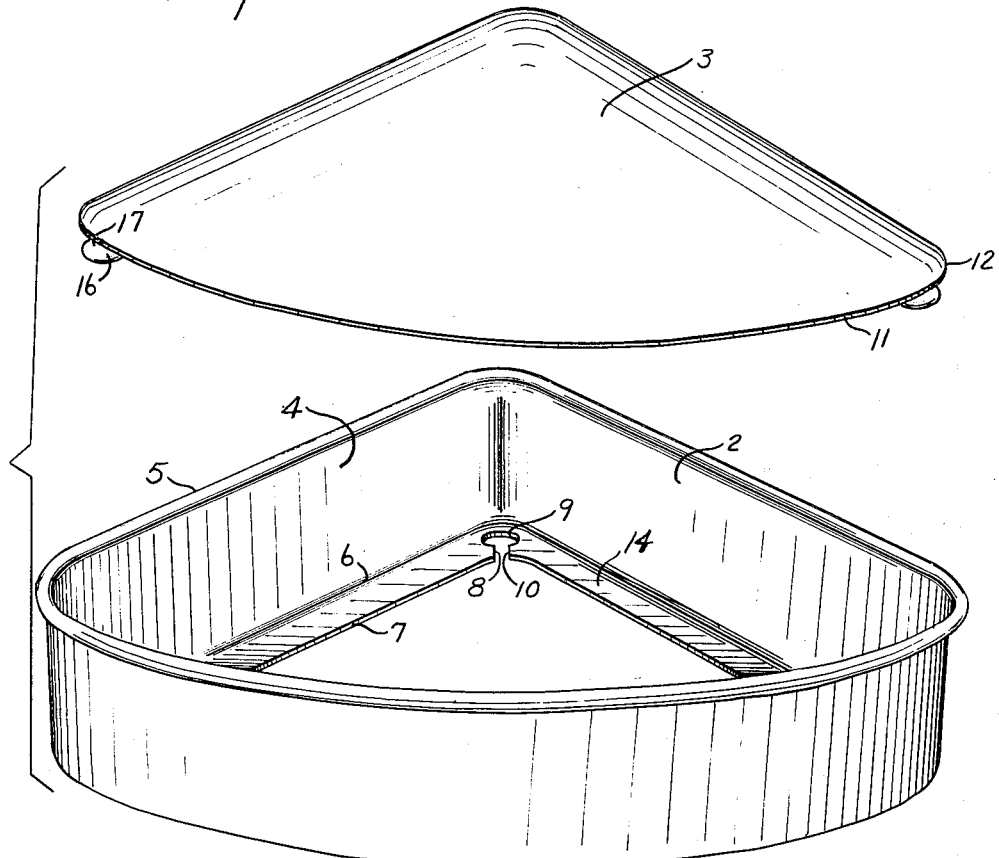
Fig. 4 is a disassembled perspective view of the bottom and shell of the drain receptacle.

The bottom member 3 has legs 15 extending downwardly therefrom in alignment with the circular holes 9 of the shell, the legs 15 being slightly less in diameter than the width of the slots 10 for passage therethrough. The legs 15 terminate in enlarged feet 16 which are larger than the holes 9 to prevent passage therethrough. The upper surfaces 17 of the feet 16 are spaced from the bottom surface 13 of the bottom member a distance corresponding to the combined thickness of the flange 7 and the desired drainage space between the bottom member and said flange when the feet 16 are resting on a supporting surface, such as a sink or the like, as illustrated in Fig. 3. While the illustrated structure has holes in the flanges for accommodating the legs, said legs may be inside of the flange and have feet portions or the like engaging under the flanges when the receptacle is resting on said feet.

The drainage space 18 is relatively narrow so that water and the like will pass therethrough but particles of garbage and other refuse will be held above the bottom member. The contour of the bottom member also facilitates the draining of all water to the side and through the drainage space 18.

In using a structure constructed as described, the receptacle is placed with the feet 16 resting on the bottom of a sink or other supporting surface and the weight of the shell will cause the flanges 7 to rest on the upper surfaces of the feet 16. As vegetable peelings, garbage and other refuse is placed in the receptacle on the bottom member 3, which is characterized by the absence of holes therethrough, the solid particles will remain supported on the bottom member and the water or other liquid will run to the side of the crowned upper surface of said bottom member between the peripheral edge 11 thereof and the side walls 4 of the shell and then through the drainage space 18 and over the inner edge of the flanges 7.

When it is desired to move the receptacle for emptying, the shell is grasped to raise the entire receptacle from the supporting surface. Then the weight of the bottom member 3 and the material thereon will cause the bottom surface 13 of said bottom member to seat on the upper surface 14 of the flange 7, stopping all drainage from the receptacle. Then the receptacle may be transported as desired and the material therein emptied by inverting the entire receptacle. During such inverting, the feet 16 will prevent the bottom member from separating from the shell.

When it is desired to clean the receptacle the flexibility of the material of at least one of the parts thereof permits sufficient bending to disengage the legs and feet from the flanges as by drawing the legs 15 on the bottom member through the slot 10, whereby the feet 16 can be moved above the flange 7. After each of the three legs are so removed, the bottom member and shell are separated and each can be easily washed or otherwise cleaned, there being no holes or sharp corners from which it is difficult to remove any particles. After thorough cleaning of the bottom member and shell, the parts are bent sufficiently to move the feet inside of the flange 7 whereby the legs 15 can be inserted through the slot 10 to again position each of the legs in the respective holes 9. The receptacle is then fully assembled and ready for use.

It is believed obvious I have provided a drain receptacle that is economical to manufacture, easily maintained in a sanitary condition and that provides for stopping of drainage during transportation of said receptacle.

What I claim and desire to secure by Letters Patent is:

1. A drain receptacle comprising, a shell having side walls with a continuous inwardly extending flange at the lower edges thereof whereby the inner edge of said flange defines a central opening in the shell, an imperforate bottom member substantially corresponding in shape to the shell with the peripheral edges of the bottom member spaced from the inner surfaces of the side walls of the shell, said bottom member and flange having mating marginal portions for seating engagement to prevent drainage through the central opening of the shell, and means depending from the bottom member and having portions adapted to engage the bottom of the flange when the receptacle is resting on said depending means, said portions of the depending means being spaced from the bottom member a distance slightly greater than the thickness of the flange whereby when the receptacle is resting on said depending means the bottom member is raised relative to the shell and the seating portions of the flange and bottom member have a space therebetween substantially equal to the maximum size of particles that may escape from the receptacle.

2. A drain receptacle comprising, separable shell and bottom members at least one of which is of flexible material, said shell having side walls with inwardly extending connected flanges at the lower edges thereof whereby the inner edges of said flanges define a central opening in the shell, said bottom member being imperforate and substantially corresponding in shape to the shell with the peripheral edges of the bottom member spaced from the inner surfaces of the side walls of the shell, said bottom member and flanges having mating marginal portions for seating engagement to prevent drainage through the central opening of the shell, and means depending from the bottom member and extending below the flanges of the shell and having portions adapted to engage the bottom of the flanges when the receptacle is resting on said depending means, said portions of the depending means being spaced from the bottom member a distance slightly greater than the thickness of the flanges whereby when the receptacle is resting on said depending means the bottom member is bodily raised relative to the shell and the seating portions of the flanges and bottom member have a space therebetween substantially equal to the maximum size of particles which may escape therethrough to the central opening of the shell, the flexible member being bendable to disengage the depending means and flanges for separation of the bottom member from the shell.

3. A drain receptacle comprising, separable shell and bottom members at least one of which is of flexible material, said shell having vertical side walls and inwardly extending continuous connected flanges at the lower edges of said side walls whereby the inner edges of said flanges define a central opening in the shell, said bottom member being crowned and imperforate and substantially corresponding in shape to the shell with the peripheral edges of the bottom member spaced from the inner surfaces of the side walls of the shell whereby material and liquid move toward the peripheral edges of said bottom member, said bottom member having bottom marginal surfaces adapted to seat on the upper inner marginal surface of the flanges to prevent drainage through the central opening of the shell, legs depending from the bottom member and extending below the flanges of the shell, and feet on the legs and under the flanges whereby the bottom of the flanges rest on the feet when the receptacle is supported by said feet, said feet being spaced from the bottom member a distance slightly greater than the thickness of the flanges whereby when the receptacle is resting on said feet the bottom member is bodily raised relative to the shell and the bottom marginal surface of the bottom member and the flanges have a space therebetween for drainage of liquid therebetween and through the central opening of the shell, said space being of a width substantially equal to the maximum size of particles which may escape from the receptacle, the flexible member being bendable to disengage the legs and feet from the flanges for separation of the bottom member from the shell.

4. A drain receptacle comprising, a shell having side walls with inwardly extending continuous connected flanges at the lower edges thereof whereby the inner edges of said flanges define a central opening in the shell, said flanges having spaced openings therein intermediate the width of said flanges with the outer portion of the opening spaced from the side walls, an imperforate bottom member substantially corresponding in shape to the shell and having a peripheral edge spaced from the inner surfaces of the side walls and extending beyond the outer portion of the openings in the flanges, said bottom member and flanges having portions for seating engagement to prevent drainage through the central opening of the shell, legs depending from the bottom member and extending through the openings in the flanges, and laterally extending portions on the legs below the flanges, said laterally extending portions being spaced from the bottom member a distance slightly greater than the thickness of the flanges whereby when the receptacle is resting on the legs the bottom member is bodily raised relative to the shell and the seating portions of the bottom member and flanges have a space therebetween substantially equal to the maximum size of particles which may escape from the receptacle.

5. A drain receptacle comprising, a shell having side walls and inwardly extending continuous connected flanges at the lower edges of said side walls whereby the inner edges of said flanges define a central opening in the shell, said flanges having spaced openings therein intermediate the width of said flanges with the outer portion of the opening spaced from the side walls, a crowned imperforate bottom member substantially corresponding in shape to the shell and having a peripheral edge spaced from the inner surface of the side walls and extending beyond the outer portion of the openings in the flanges whereby liquid in the shell flows toward the peripheral edge of said bottom, said bottom member having a bottom marginal surface adapted to seat on the upper surface of the flanges to prevent drainage through the central opening of the shell, legs depending from the bottom member and extending through the openings in the flanges, and feet on the legs of larger size than the openings, said feet being spaced from the bottom member a distance slightly greater than the thickness of the flanges whereby when the receptacle is resting on the feet the bottom member is bodily raised and spaced from the flanges sufficiently to permit drainage of liquid therebetween, said space being substantially equal to the maximum size of particles which may escape from the receptacle.

6. A drain receptacle comprising, a shell having substantially vertical side walls and inwardly extending continuous connected flanges at the lower edges of said side walls whereby the inner edges of the flanges define a central opening in the shell, said flanges having spaced openings therein between the side walls and the inner edges of the flanges with the outer portions of the openings spaced from the side walls and the inner portion of the openings extending to the inner edges of the flanges, a crowned imperforate bottom member substantially corresponding in shape to the shell and having a peripheral edge spaced from the inner surface of the side walls and extending beyond the outer portions of the openings in the flanges whereby material and liquid tend to move toward the peripheral edge of said bottom member, said bottom member having a bottom surface adapted to seat on the upper surface of the flanges to prevent drainage from the central opening of the shell, legs on the bottom member and extending through the openings in the flanges, and feet on the legs of larger size than the openings, said feet being spaced from the bottom member a distance greater than the thickness of the flanges whereby when the receptacle is resting on the feet the bottom surface of the bottom member is bodily raised and spaced from the flanges sufficiently for drainage of liquid therebetween said space being of a width substantially equal to the maximum size of particles which may escape from the receptacle, said shell and bottom member being of non-corrosive flexible material for bending of same to move the legs from the openings beyond the inner edges of the flanges for separation of the bottom member and the shell.

References Cited in the file of this patent
UNITED STATES PATENTS

| | | |
|---|---|---|
| 1,160,869 | Fisher | Nov. 16, 1915 |
| 1,667,770 | Carpmael | May 1, 1923 |
| 2,030,708 | Mitchell | Feb. 11, 1936 |
| 2,466,158 | Di Salino | Apr. 5, 1949 |